United States Patent

Doi et al.

Patent Number: 5,208,307
Date of Patent: May 4, 1993

[54] OPTICAL MATERIAL

[75] Inventors: Toru Doi; Tomohiro Ishikawa, both of Yokkaichi, Japan

[73] Assignee: Tosoh Corporation, Yamaguchi, Japan

[21] Appl. No.: 746,663

[22] Filed: Aug. 19, 1991

[30] Foreign Application Priority Data

Aug. 24, 1990 [JP] Japan ................................. 2-221212

[51] Int. Cl.$^5$ .............................................. C08F 22/40
[52] U.S. Cl. ................................................... 526/262
[58] Field of Search ........................................ 526/262

[56] References Cited

FOREIGN PATENT DOCUMENTS

| 0363870 | 4/1990 | European Pat. Off. |
| 1-190709 | 7/1989 | Japan . |
| 50-2167324 | 6/1990 | Japan ................................. 526/262 |
| 62-257913 | 11/1990 | Japan . |
| 1077807 | 2/1967 | United Kingdom . |

OTHER PUBLICATIONS

Otsu et al., Chemical Abstracts, vol. 144, No. 6, abstract 43623, Feb. 11, 1991.

Takateru, Chemical Abstracts, vol. 110, No. 12, Abstract No. 214135, Jun. 12, 1989.

*Primary Examiner*—Joseph L. Schofer
*Assistant Examiner*—Alex H. Walker
*Attorney, Agent, or Firm*—Nixon & Vanderhye

[57] ABSTRACT

An optical material, comprising a resin composed of a polymer constituted of 10 of 95 mol %, based on the polymer, of a first structural unit represented by the formula (I) and 90 to 5 mol %, based on the polymer, of a second structural unit represented by the formula (II), and having a weight-average molecular weight of from $1 \times 10^3$ to $5 \times 10^6$ in polystyrene equivalent:

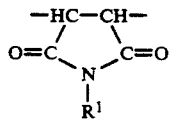

The optical material has a Tg value not less than 120° C., a light transmittance value not less than 85%, and a pencil hardness not lower than H.

5 Claims, No Drawings

OPTICAL MATERIAL

BACKGROUND OF THE INVENTION

1. Field of the Invention

The present invention relates to an optical material which comprises an N-(cyclic) alkyl-substituted maleimide-olefin copolymer, and which is superior in transparency, heat resistance, and surface hardness.

2. Description of the Related Art

Heretofore, optical materials are generally made of glass. Recently, transparent polymer materials have come to be used for optical materials in view of their productivity, light-weight, cost and so forth.

Such polymer materials includes, in particular, polymethyl methacrylate (hereinafter referred to as "PMMA") and polycarbonate (hereinafter referred to as "PC").

PMMA, however, is limited in its use because of its insufficient heat-resistance resulting from its low glass transition temperature (Tg) of about 100° C., although it has superior optical characteristics.

PC, which has a Tg of about 150° C. and has relatively high heat resistance, involves the disadvantage of low surface hardness causing susceptibility to scratching, so that further improvement was desired.

On the other hand, maleimide type copolymers are being studied comprehensively because of its high heat resistance. For example, copolymerization of the aforementioned methyl methacrylate with N-aromatic-substituted maleimide is disclosed in Japanese Patent Publication No. Sho 43-9753, Japanese Laid-Open Patent Applications Nos. Sho 61-141715, Sho 61-171708, and Sho 62-109811; and copolymerization of styrene resins with N-aromatic-substituted maleimide is disclosed in Japanese Laid-Open Patent Applications Nos. Sho 47-6891, Sho 61-76512, and Sho 61-276807. The resins produced by these methods are improved more in heat resistance with the higher content of N-aromatic-substituted maleimide, but thereby causing problems of brittleness, low moldability, discoloration, and so forth, thus being limited in use for optical materials.

After comprehensive study regarding the above problems, it was found that an optical material comprising an N-(cyclic) alkyl-substituted maleimide-olefin type copolymer solves the problems, and the present invention has been accomplished.

SUMMARY OF THE INVENTION

The present invention intends to provide an optical materials which is superior in transparency, heat resistance, and surface hardness.

The present invention provides an optical material, comprising a resin composed of a polymer constituted of 10 to 95 mol %, based on the polymer, of a first structural unit represented by the formula (I), and 90 to 5 mol %, based on the polymer, of a second structural unit represented by the formula (II), and having a weight-average molecular weight of from $1 \times 10^3$ to $5 \times 10^6$ in polystyrene equivalent:

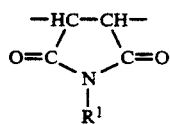

(I)

where $R^1$ is an cyclic alkyl group represented by $C_mH_{2m-1}$ or a linear or branched alkyl group represented by $C_nH_{2n+1}$; m is an integer of 3 to 8; and n is an integer of 1 to 18;

$$-CH_2-CHR^2- \quad (II)$$

where $R^2$ denotes hydrogen or an alkyl group having 1 to 8 carbons.

DETAILED DESCRIPTION OF THE PREFERRED EMBODIMENT

The resin constituting the optical materials of the present invention can be derived, for example, from radical copolymerization of an N-(cyclic) alkyl-substituted maleimide with an olefin.

The N-(cyclic) alkyl-substituted maleimide which gives the constitutional unit (I) includes N-methylmaleimide, N-ethylmaleimide, N-n-propylmaleimide, N-isopropylmaleimide, N-n-butylmaleimide, N-isobutylmaleimide, N-s-butylmaleimide, N-t-butylmaleimide, N-n-pentylmaleimide, N-n-hexylmaleimide, N-n-heptylmaleimide, N-n-octylmaleimide, N-laurylmaleimide, N-stearylmaleimide, N-cyclopropylmaleimide, N-cyclobutylmaleimide, N-cyclopentylmaleimide, N-cyclohexylmaleimide, N-cyclooctylmaleimide, and the like. These may be used singly or used combinedly in polymerization.

The olefin which gives the constitutional unit (II) includes ethylene, propylene, 1-butene, 1-hexene, 1-octene, and the like. These may be used singly or combinedly in polymerization. Ethylene is particularly preferred.

The content of the constitutional unit (I) is in the range of from 10 to 95 mol %, preferably from 20 to 90 mol %, more preferably from 25 to 80 mol %, of the whole polymer.

The content of the constitutional unit (II) is in the range of from 5 to 90 mol %, preferably from 10 to 80 mol %, more preferably from 20 to 75 mol %.

An additional vinyl monomer may be copolymerized, if necessary, within the range in which the object of the present invention is achievable. The additional vinyl monomer includes styrene, α-methylstyrene, vinyltoluene, 1,3-butadiene, isoprene, and their halogenated derivatives; methacrylic esters such as methyl methacrylate, ethyl methacrylate, propyl methacrylate, cyclohexyl methacrylate, phenyl methacrylate, and benzyl methacrylate; acrylic esters such as methyl acrylate, ethyl acrylate, butyl acrylate, lauryl acrylate, cyclohexyl acrylate, phenyl acrylate, and benzyl acrylate; vinyl esters such as vinyl acetate, and vinyl benzoate; vinyl ethers such as methyl vinyl ether, ethyl vinyl ether, propyl vinyl ether, and butyl vinyl ether; vinyl chloride, vinylidene chloride, maleic anhydride, N-phenylmaleimide, N-carboxyphenylmaleimide, and acrylonitrile, or a combination of two or more thereof.

The polymerization of these monomers may be conducted by any known polymerization process including bulk polymerization, solution polymerization, suspension polymerization, and emulsion polymerization.

The polymerization initiator includes organic peroxides such as benzoyl peroxide, lauryl peroxide, octanoyl peroxide, acetyl peroxide, di-t-butyl peroxide, t-butyl cumyl peroxide, dicumyl peroxide, t-butyl peroxyacetate, and t-butyl peroxybenzoate; and azo type initiators such as 2,2'-azobis(2,4-dimethylvaleronitrile), 2,2'-azobis(2-butyronitrile), 2,2'-azobisisobutylonitrile, dimethyl-2,2'-azobisisobutylate, and 1,1'-azobis (cyclohexane-1-carbonitrile).

The solvent useful in the solution polymerization includes benzene, toluene, xylene, ethylbenzene, cyclohexane, dioxane, tetrahydrofuran, acetone, methyl ethyl ketone, ethyl acetate, dimethylformamide, isopropyl alcohol, butyl alcohol, and the like.

The polymerization temperature is suitably decided depending on the decomposition temperature of the initiator. Generally the temperature is preferably in the range of from 40° to 350° C.

The above resin can also be obtained by imidation of a copolymer of maleic anhydride and an aforementioned olefin by use of a primary amine.

The primary amine includes methylamine, ethylamine, n-propylamine, isopropylamine, n-butylamine, isobutylamine, s-butylamine, t-butylamine, n-pentylamine, n-hexylamine, n-heptylamine, n-octylamine, laurylamine, stearylamine, cyclopropylamine, cyclobutylamine, cyclopentylamine, cyclohexylamine, cyclooctylamine, and the like. These may be used singly or a combination of two or more thereof.

The weight-average molecular weight of the resulting polymer can be measured by gel permeation chromatography (GPC) in styrene equivalent. The molecular weight of the resin of the present invention is in the range of from $1 \times 10^3$ to $5 \times 10^6$, preferably from $1 \times 10^4$ to $1 \times 10^6$. The polymers having molecular weight of higher than $5 \times 10^6$ are poor in moldability, while the polymers having molecular weight of lower than $1 \times 10^3$ are brittle.

The resin of the present invention may contain a hindered phenol, a heat stabilizer such as organic phosphate esters, a benzotriazole type UV absorbing agent, a hindered amine type UV stabilizer, a lubricant or the like.

Further, the resin of the present invention may be blended with another compatible resin, if necessary.

The resin of the present invention can be molded by an ordinary molding process including injection molding, extrusion molding, and compression molding The resulting molded articles are useful for optical parts, for example optical recording mediums such as optical discs, optical cards, optical lenses such as of cameras and videos, automobile lenses such as headlight lenses, and optical fibers, lighting fixtures and so on.

The present invention is described below by reference to examples without limiting the invention thereto in any way.

The optical material composed of the polymer according to the present invention has a Tg value not less than 120° C., preferably not less than 140° C., a light transmittance value not less than 85%, preferably not less than 90%, and a pencil hardness not lower than H.

The Tg of the resulting polymer was measured in nitrogen atmosphere at a temperature elevation rate of 10° C./min. by means of a differential scanning calorimeter, DSC200 (made by Seiko Denshi K.K.).

The decomposition temperature (Td) of the resulting polymer was measured in nitrogen atmosphere at a temperature elevation rate of 40° C./min. by means of TG/DTA200 (made by Seiko Denshi K.K.).

The molecular weight of the resulting polymer was measured by means of GPC (HLC-802A, made by Tosoh Corporation) in polystyrene equivalent.

The light transmittance, the pencil hardness and the rockwell hardness are measured by use of test specimens of the size of 50 mm $\times$ 25 mm $\times$ 0.8 mm according to ASTM 1746, JIS K5401, and JIS K7202 respectively.

EXAMPLE 1

179 g (1.0 mole) of N-cyclohexylmaleimide, 0.8 g ($5.0 \times 10^{-3}$ mole) of 2,2'-azobisisobutyronitrile (AIBN), and 1 liter of toluene were placed in a 3-liter autoclave equipped with a stirrer, a nitrogen introducing tube, a thermometer, and a degassing tube. The autoclave was purged with nitrogen several times. Ethylene was charged therein to an inner pressure of 50 Kg/cm$^2$ at 60° C. The mixture was reacted at 60° C. for 10 hours.

The reaction mixture was poured into ethanol to deposit the polymer. The obtained polymer was purified by reprecipitation from toluene-ethanol, and was dried at a reduced pressure at 60° C. for 24 hours. The yield of the polymer was 38 g.

The mole ratio of N-cyclohexylmaleimide units to ethylene units of the resulting polymer was 48/52 according to elemental analysis. The polymer had a weight-average molecular weight (Mw) of 86000, and a Td of 404° C. From this polymer, colorless transparent test specimens were prepared by pressing it at 250° C., and 5 Kg/cm$^2$ The evaluation results of the polymer are shown in Table 1.

COMPARATIVE EXAMPLES 1 TO 3

Test specimens were prepared from PMMA (ACRYPET made by Mitsubishi Rayon Co., Ltd.), PC (PANLITE made by Teijin Kasei K.K.), and polystyrene (DENKA STYROL made by Denki Kagaku Kogyo K.K.), and were evaluated in the same manner as in Example 1. The results of the evaluation are shown in Table 1.

As clearly understood from the Examples, present invention provides an optical material which is superior in transparency, heat resistance, and surface hardness.

TABLE 1

| | Polymer Composition (mol %) | Tg (°C.) | Light Transmittance (%) | Pencil Hardness | Rockwell Hardness |
| --- | --- | --- | --- | --- | --- |
| Example 1 | N-cyclohexylmaleimide (48) Ethylene (52) | 170 | 90 | 2H | 98 |
| Comparative Example 1 | PMMA | 105 | 90 | 2H | 98 |
| Comparative Example 2 | PC | 150 | 88 | B | 53 |
| Comparative Example 3 | Polystyrene | 93 | 87 | F | 65 |

What is claimed is:

1. An optical lens comprising a resin composed of a polymer containing 20 to 90 mol %, based on the polymer, of a first structural unit represented by the formula (I) and 80 to 10 mol %, based on the polymer, of a second structural unit represented by the formula (2), and having a weight-average molecular weight of from $1 \times 10^4$ to $1 \times 10^5$ in polystyrene equivalent, a light transmittance value not less than 85%, a $T_g$ value not less than 120° C. and a pencil hardness not lower than B:

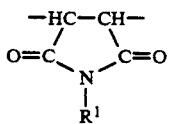

where $R^1$ is a cyclic alkyl group represented by $C_mH_{2m-1}$ or a linear or branched alkyl group represented by $C_nH_{2n+1}$; m is an integer of 3 to 8; and n is an integer of 1 to 18;

$$-CH_2-CHR^2- \qquad (II)$$

where $R^2$ denotes hydrogen or an alkyl group having 1 to 8 carbons.

2. An optical fiber comprising a resin composed of a polymer containing 20 to 90 mol %, based on the polymer, of a first structural unit represented by the formula (1) and 80 to 10 mol %, based on the polymer, of a second structural unit represented by the formula (2), and having a weight-average molecular weight of from $1 \times 10^4$ to $1 \times 10^5$ in polystyrene equivalent, a light transmittance value not less than 85%, a Tg value not less tan 120° C. and a pencil hardness not lower than B:

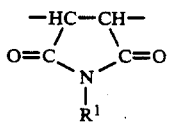

where $R^1$ is a cyclic alkyl group represented by $C_mH_{2m-1}$ or a linear or branched alkyl group represented by $C_nH_{2n+1}$; m is an integer of 3 to 8;and n is an integer of 1 to 199
where $R^3$ denotes hydrogen or an alkyl group having 1 to 89 carbons.

3. An optical disc substrate comprising a resin composed of a polymer containing 20 to 90 mol %, based on the polymer, of a first structural unit represented by the formula (1) and 80 to 10 mol %, based on the polymer, of a second structural unit represented by the formula (2), and having a weight-average molecular weight of from $1 \times 10^4$ to $1 \times 10^5$ in polystyrene equivalent, a light transmittance value not less than 85%, a Tg value not less than 120° C. and a pencil hardness not lower than B:

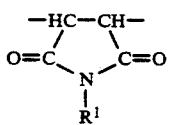

where $R^1$ is a cyclic alkyl group represented by $C_mH_{2m-1}$ or a integer of 3 to 8; and n is an integer of 1 to 18;

$$-CH_2-CHR^3- \qquad (II)$$

where $R^2$ denotes hydrogen or an alkyl group having 1 to 8 carbons.

4. An automobile lens comprising a resin composed of a polymer containing 20 to 90 mol %, based on the polymer, of a first structural unit represented by the formula (1) and 80 to 10 mol %, based on the polymer, of a second structural unit represented by the formula (2), and having a weight-average molecular weight of from $1 \times 10^4$ to $1 \times 10^5$ in polystyrene equivalent, a light transmittance value not less than 85%, a Tg value not less than 120° C. and a pencil hardness not lower than B:

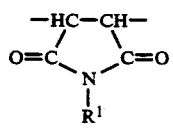

where $R^1$ is a cyclic alkyl group represented by $C_mH_{2m-1}$ or a linear or branched alkyl group represented by $C_nH_{2n+1}$; m is an integer of 3 to 8; and n is an integer of 1 to 18;

$$-CH_2-CHR^2- \qquad (II)$$

where $R^2$ denotes hydrogen or an alkyl group having 1 to 8 carbons.

5. A lighting fixture comprising a resin composed of a polymer containing 20 to 90 mol %, based on the polymer, of a first structural unit represented by the formula (1) and 80 to 10 mol %, based on the polymer, of a second structural unit represented by the formula (2), and having a weight-average molecular weight of from $1 \times 10^4$ to $1 \times 10^5$ in polystyrene equivalent, a light transmittance value not less than 85%, a Tg value not less than 120° C. and a pencil hardness not lower than B:

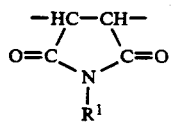

where $R^1$ is a cyclic alkyl group represented by $C_mH_{2m-1}$ or a linear or branched alkyl group represented by $C_nH_{2n+1}$; m is an integer of 3 to 8; and n is an integer of 1 to 18;

$$-CH_2-CHR^2-TM(II)$$

where $R^2$ denotes hydrogen or an alkyl group having 1 to 8 carbons.

* * * * *